US011026271B2

(12) United States Patent
Yang et al.

(10) Patent No.: US 11,026,271 B2
(45) Date of Patent: Jun. 1, 2021

(54) ELECTRONIC DEVICE AND INFORMATION PROCESSING METHOD

(71) Applicant: Lenovo (Beijing) Co., Ltd., Beijing (CN)

(72) Inventors: Yuguang Yang, Beijing (CN); Super Liao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 119 days.

(21) Appl. No.: 16/369,745

(22) Filed: Mar. 29, 2019

(65) Prior Publication Data

US 2019/0306900 A1 Oct. 3, 2019

(30) Foreign Application Priority Data

Mar. 30, 2018 (CN) .......................... 201810297214.8

(51) Int. Cl.
| | | |
|---|---|---|
| *G06F 15/16* | (2006.01) | |
| *H04W 76/10* | (2018.01) | |
| *G06F 13/42* | (2006.01) | |
| *H04L 29/08* | (2006.01) | |
| *H04B 1/3827* | (2015.01) | |

(52) U.S. Cl.
CPC ........ *H04W 76/10* (2018.02); *G06F 13/4282* (2013.01); *H04L 67/10* (2013.01); *G06F 2213/0042* (2013.01); *H04B 1/3827* (2013.01)

(58) Field of Classification Search
CPC .. B60R 11/00; B60R 11/0241; B60R 11/0258
See application file for complete search history.

(56) References Cited

U.S. PATENT DOCUMENTS

| | | | |
|---|---|---|---|
| 2010/0203883 A1* | 8/2010 | DeMarco ................ | H04M 1/04 455/427 |
| 2013/0202301 A1* | 8/2013 | Ago ..................... | H05B 47/175 398/58 |
| 2014/0160997 A1* | 6/2014 | Rhee ..................... | H04L 65/403 370/261 |
| 2017/0111102 A1* | 4/2017 | Fan ..................... | H04B 7/18504 |
| 2017/0194790 A1* | 7/2017 | Kim ..................... | H02J 13/0079 |
| 2018/0295560 A1* | 10/2018 | Hodge .................. | H04W 24/10 |

* cited by examiner

*Primary Examiner* — Brian Whipple
*Assistant Examiner* — Gregory P Tolchinsky
(74) *Attorney, Agent, or Firm* — Anova Law Group, PLLC

(57) ABSTRACT

An electronic device and an information processing method are provided. The electronic device includes a master device and a slave device. The master device includes a first functional component with a first function. The first function comprises transmitting a first wireless signal and receiving a second wireless signal transmitted by an external electronic device. In response to that the slave device is physically connected to the master device, the slave device performs the first function. In response to that the slave device is separated from the master device, the slave device performs a second function. The second function is different from the first function.

13 Claims, 3 Drawing Sheets

ELECTRONIC DEVICE AND INFORMATION PROCESSING METHOD

CROSS-REFERENCES TO RELATED APPLICATIONS

This application claims priority of Chinese Patent Application No. 201810297214.8, filed on Mar. 30, 2018, the entire contents of which are hereby incorporated by reference.

FIELD OF THE INVENTION

The present disclosure generally relates to the field of wireless technologies and, more particularly, relates to an electronic device and an information processing method.

BACKGROUND

Existing wireless devices are generally divided into two categories. The first category includes general-purpose devices that integrate a large number of functions, such as mobile phones. Although general-purpose devices integrate many functions, they cannot meet the needs of specific split scenarios. The second category includes dedicated devices. The dedicated devices are specific devices set for a specific function. The dedicated devices cannot meet the needs of multi-demand and multi-scenario applications.

Therefore, existing wireless devices often have problems such as single function and limited applications. The disclosed methods and systems are directed to solve one or more problems set forth above and other problems.

BRIEF SUMMARY OF THE DISCLOSURE

One aspect of the present disclosure provides an electronic device. The electronic device includes a master device and a slave device. The master device includes a first functional component with a first function. The first function comprises transmitting a first wireless signal and receiving a second wireless signal transmitted by an external electronic device. In response to that the slave device is physically connected to the master device, the slave device performs the first function. In response to that the slave device is separated from the master device, the slave device performs a second function. The second function is different from the first function.

Another aspect of the present disclosure provides another electronic device as a slave device. The electronic device includes a first connection module and a second functional component. The first connection module is capable of establishing a detachable connection with a master device. In response to that the slave device is connected to the master device, the second functional component performs a first function of the first functional component of the master device. In response to that the slave device is separated from the master device, the second functional component performs a second function. The second function is different from the first function.

Another aspect of the present disclosure provides an information processing method. In response to that the slave device is physically connected to the master device, both the second functional component of the slave device and the first functional component of the master device perform the first function. In response to that the slave device is separate from the master device, the slave device performs the second function. The second function is different from the first function.

Other aspects of the present disclosure can be understood by those skilled in the art in light of the description, the claims, and the drawings of the present disclosure.

DETAILED DESCRIPTION

The technical solutions of the present disclosure are further elaborated below in conjunction with accompanying drawings and specific embodiments.

Figure 1:
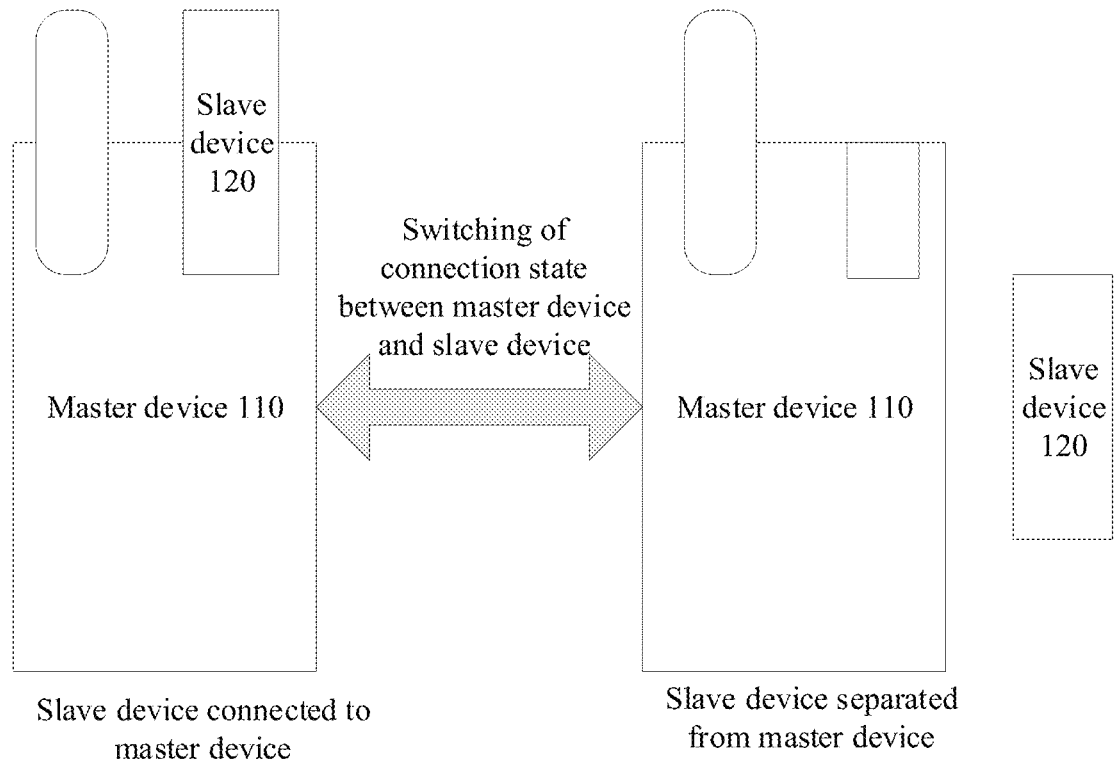
FIG. 1 illustrates a structural diagram of an electronic device consistent with the disclosed embodiments.

FIG. 1 illustrates a structural diagram of an electronic device consistent with the disclosed embodiments. As shown in FIG. 1, an electronic device is provided, which may be referred as a first electronic device. The electronic device includes a master device 110 and a slave device 120.

The master device 110 comprises a first functional component with a first function. The slave device 120 performs the first function if the slave device 120 is physically connected to the master device 110, and performs a second function if the slave device 120 is separated from the master device 110. The first function comprises transmitting a first wireless signal, and receiving a second wireless signal transmitted by a second electronic device. The second function is different from the first function.

The master device 110 is generally provided for implementing main functions for the first electronic device. If the first electronic device is a wireless router, the master device 110 can be connected to various wired networks. For example, the master device 110 is connected to a network through a cable interface, or connected to a network through a fiber optic interface. The first electronic device can convert a wired signal received from the network into a wireless signal, and simultaneously convert a wireless signal into a wired signal and route the wired signal to the target device. The main functions of the first electronic device may include the routing function and the wireless communication function.

The slave device 120 can be part of the first electronic device, and can establish a detachable connection with the master device 110. Accordingly, the slave device 120 has a first state and a second state relative to the master device 110. If the first state is a separated state between the slave device 120 and the master device 110, the second state is a connection or contact binding state between the slave device 120 and the master device 110. If the first state is a connection or contact binding state between the slave device 120 and the master device 110, the second state is a separated state between the slave device 120 and the master device 110.

In the connection or contact binding state, there may exist a physical connection or contact between the slave device 120 and the master device 110 and, in the separated state, there might not be a physical connection or contact between the slave device 120 and the master device 110. The physical connection in one embodiment includes: contact between the master device 110 and the slave device 120 and a buckle state between the interfaces.

In one embodiment, the slave device 120 performs the second function when the slave device 120 is separated from the master device 110, and performs the first function when the slave device 120 is connected to the master device 110. The first function realizes the transmission and reception of the wireless signal, that is, the wireless routing function.

For example, if the first electronic device is a wireless router, the slave device 120 may be a detachable antenna that can be separately detached from the master device 110. When the detachable antenna is connected to the master device 110, the antenna can act as an antenna of the master device 110. The antenna performs wireless signal interaction with the second electronic device like other antennas. In this case, the first function is the antenna function. If the detachable antenna is separated from the master device 110, the detachable antenna also functions as a relay. For example, the detachable antenna can relay the wireless signal of the antenna on the master device 110, so as to increase the wireless signal coverage. In this case, the second function is the relay function. Thus, the wireless router not only has the wireless routing function, but also has the relay amplification function.

On the other hand, multi-antenna wireless routers are mainly designed for the needs of groups such as homes or companies that require a large coverage. Under normal circumstances, multi-antenna wireless routers transmit the signal through multiple antennas to achieve strong wireless coverage over long distances. However, although the multi-antenna wireless router has a certain improvement in the strength of the wireless signal over a long distance, the coverage of the wireless signal cannot be improved. In order to achieve a wider coverage, it is often necessary to purchase a repeater. However, at least one of the wireless routers in present disclosure can be detached and act as a repeater alone. Obviously a user does not need to purchase and install an additional repeater. If the user finds that the wireless signal at a certain location in the home or company is weak, the slave device 120 can be detached from the master device 110 and placed in a position that the master device 110 can cover, and the slave device 120 performs radio signal emitting again. The coverage may be increased accordingly. Therefore, no additional repeater is required for the user, the wireless routing coverage is wider than that of the multi-antenna, and the hardware cost is also reduced.

In some embodiments, the first function of the slave device 120 may receive the first wireless signal and the second wireless signal. After the slave device 120 is detached from the master device 110, the detection chip of the slave device 120 may be utilized as a radiation detection device to detect radiation from the surrounding environment. The radiation detection function of the slave device 120 as the radiation detection device is the second function described above. In one embodiment, the slave device 120 uses its own antenna as a receiving antenna for detecting the radiation intensity of the wireless signal.

In some embodiments, the slave device 120 can be detached as a wireless USB device such as a USB wireless network card. For example, a USB interface, a circuit board, and an antenna are disposed on the slave device 120 and a control switch is disposed on the connection links of the antenna. If the slave device 120 is connected to the master device 110, the first link of the antenna as one of antennas on the wireless router is turned on. If the slave device 120 is separated from the master device 110, the second link of the antenna is turned on. The slave device 120 acts as a wireless USB device and can be inserted into a personal computer (PC) and the like to generate a wireless USB signal for wireless USB transmission between different electronic devices. Therefore, if the slave device 120 is a wireless USB device, the first function can still function as the antenna function of the router, and the second function can be the wireless USB function.

In some embodiments, when the wireless USB device is connected to an electronic device such as a PC and the like, on the one hand, the wireless USB device can perform the first function of the USB wireless transmission. On the other hand, the wireless USB device can be used as a wireless storage device after being detached from the electronic device such as a PC and the like. The storage device can perform the second function of the wireless USB device. In one embodiment, the wireless USB device can be used as a slave device of an ancillary device of various devices such as a PC and the like.

Accordingly, in one embodiment, for a multi-antenna wireless router, at least one of the antennas can be made as a slave device 120 detached from the master device 110. The second function of the slave device 120 is utilized to enrich the overall functions of the first electronic device, thereby improving the effective usage rate of the first electronic device.

In one embodiment, both the master device 110 and the slave device 120 include respective enclosures, and electronic components such as respective antenna oscillators and the like are disposed in the respective enclosures. The antenna may include a variety of antennas such as a monopole antenna, a dipole antenna or a slot antenna.

In one embodiment, when the slave device 120 performs the second function, the slave device 120 is provided for receiving and amplifying the first wireless signal, receiving the second wireless signal, and transmitting the received second wireless signal to the master device 110.

The first wireless signal may be generated according to the electrical signal or the electromagnetic signal transmitted by the master device 110. The second wireless signal may be the wireless signal transmitted by the second electronic device.

When the slave device 120 performs the second function, after the first wireless signal is received, the first wireless signal is converted into an electrical signal, and the electrical signal is amplified and transmitted, thereby improving the overall coverage of the first electronic device.

For example, the slave device 120 receives the first wireless signal and obtains an electrical signal. The slave device 120 directly amplifies the electrical signal to obtain an amplified electrical signal. The slave device 120 transmits a corresponding wireless signal according to the amplified electrical signal, thereby achieving the function of amplifying the first wireless signal. For another example, the slave device 120 receives the first wireless signal and obtains an electrical signal. The slave device 120 copies the electrical signal, amplifies and transmits the corresponding wireless signal, thereby achieving the function of amplifying the first wireless signal.

After the slave device 120 amplifies the first wireless signal, the first wireless signal may introduce various noises of the transmission channel after a certain transmission. The slave device 120 may also perform operations such as shaping or de-interference and the like on the received first wireless signal, thereby recovering the original first wireless signal transmitted by the master device 110, and amplifying the recovered first wireless signal.

Figure 2:
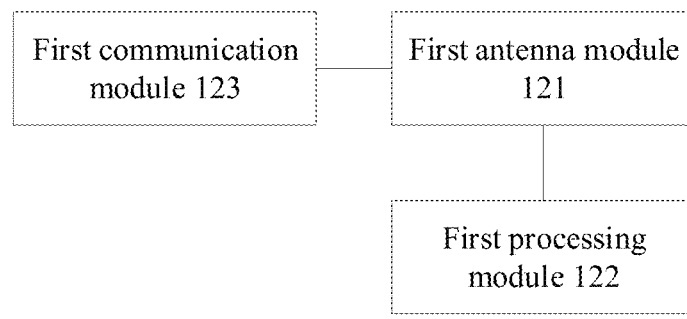
FIG. 2 illustrates a structural diagram of a slave device consistent with the disclosed embodiments.

As shown in FIG. 2, the specific structure of the slave device 120 performing the first function includes: a first communication module 123, a first antenna module 121, and a first processing module 122. When the slave device 120 performs the first function, the first communication module 123 receives a first internal signal that generates the first wireless signal by a second communication module of the master device 110, or transmits a second internal signal generated according to the second wireless signal to the master device 110. The first antenna module 121 is connected to the first communication module 123 to transmit the first wireless signal and receive the second wireless signal when the slave device 120 performs the first function.

For example, when the first communication module 123 performs the first function, the first communication module 123 may be a wired module and directly establishes a wired connection with the second communication module of the master device 110. The wired signal provided by the second communication module is received by the communication module 123. In this case the first internal signal is a wired signal.

In other embodiments, the first communication module 123 and the second communication module may be electromagnetic coupling communication modules. The physical connection between the first communication module 123 and the second communication module is not directly established and the distance between the two modules is short. The first internal signal can be received by the first communication module 123 from the second communication module through the alternating electromagnetic field. In this case the first internal signal is a wireless electromagnetic signal Accordingly, in one embodiment, the first antenna module 121 may be an antenna disposed in the slave device 120, and may be processed by carrier wave loading and the like according to the first internal signal to form the corresponding first wireless signal.

A structure of the slave device 120 performing the second function includes a first processing module 122, comprising: an amplifying submodule for, when the slave device 120 performs the second function, amplifying the first wireless received from the master device 110 and forming a third internal signal; a first antenna module 121 for, when the slave device 120 performs the second function, receiving a first wireless signal transmitted by the master device 110, and transmitting a second wireless signal received by the second electronic device to the master device 110, and transmitting a third wireless signal corresponding to the first wireless signal according to the third internal signal.

The slave device 120 in one embodiment further includes a first processing module 122. The first processing module 122 includes an amplifying submodule. The amplifying submodule can be a wireless signal power amplifier, or an amplifying circuit of the electrical signal. The amplifying circuit is in a operational state when the slave device 120 performs the second function. The amplification of the first wireless signal can be implemented to obtain the third internal signal.

The first antenna module 121 may receive signals from the amplifying submodule and transmit a third wireless signal, or receive a second wireless signal from the second electronic device and transmit the received second wireless signal to the master device 110.

The following provides a specific structure that can simultaneously perform the first function and the second function. The slave device 120 includes: a first communication module 123 for, when the slave device 120 performs the first function, from the second communication module of the master device 110, receiving a first internal signal that generates the first wireless signal, or transmitting a second internal signal generated according to the second wireless signal to the master device 110; an antenna module 121 connected to the first communication module 123, for transmitting the first wireless signal and receiving the second wireless signal when the slave device 120 performs the first function; a processing module 122 comprising an amplifying submodule for, when the slave device 120 performs the second function, amplifying the first wireless signal received from the master device 110 and form a third internal signal; and the first antenna module 121 for, when the slave device 120 performs the second function, receiving the first wireless signal transmitted by the master device 110, and transmitting the second wireless signal received by the second electronic device to the master device 110, and transmitting a third radio signal corresponding to the first radio signal according to the third internal signal. In one embodiment, the first internal signal and the second internal signal are signals transmitted inside the first electronic device when the master device and the slave device are integrated into one body. The third internal signal is a signal transmitted only inside the slave device when the slave device is separated from the master device. The first internal signal may be a signal to be modulated, and the second internal signal may be an electrical signal converted from a wireless signal.

Accordingly, there are many specific structures of the slave device 120 performing the first function and the second function in in one embodiment.

In some embodiments, the first processing module 122 may include a rectifier, an interference filter, and the like in addition to the amplifying circuit or the amplifier. The rectifier or interference filter may perform de-interference and de-noise on the electrical signal corresponding to the received first wireless signal, thereby again increasing the achievable functions of the slave device 120.

In one embodiment, if the slave device 120 is connected to the master device 110, the first processing module 122 is in a first operational state, and at least the amplifying submodule is in a non-operational state. If the slave device 120 is separated from the master device 110, the first processing module 122 is in a second operational state, and the amplifying submodule is in a operational state.

For example, a control switch is disposed on a contact surface where the slave device 120 is in contact with the master device 110. The switching state of the control switch can be switched when the slave device 120 is separated from or connected to the master device 110. If the master device 110 is connected to the slave device 120, the control switch is in a first switching state, otherwise in a second switching state. If the control switch is in the first switching state, the amplifying submodule is in a non-operational state. If the control switch is in the second switching state, the amplifying submodule is in an operational state. The non-operational state of the amplifying submodule includes a state in which the signal amplification cannot be performed, such as a closed state or a sleeping state. When the slave device 120 performs the first function, the slave device 120 may not need to perform the second function. In order to reduce unnecessary power consumption, in one embodiment, the slave device 120 may at least make the amplifying submodule of the first processing module 122 enter into the non-operational state to reduce unnecessary standby power consumption.

In one embodiment, the first communication module 123 includes a first wired interface module. The second communication module includes a second wired interface module. If the first wired interface module is in contact with the second wired interface module, the slave device 120 is connected to the master device 110. If the connection between the first wired interface module and the second wired interface is removed, the slave device 120 is separated from the master device 110.

In one embodiment, both the first wired interface module and the second wired interface module are one of wired interface modules. For example, the first wired interface module and the second wired interface module may be various bus interfaces, such as a PCI interface, a USB interface, or a COM interface and the like.

If the first wired interface module is a male connector, then the second wired interface module is a female connector. If the first wired interface module is a female connector, then the second wired interface module is a male connector. In short, the first wired interface module and the second wired interface module are mutually adapted, and the information interaction between the two wired interface modules can continue.

In some embodiments, the male and the female connectors of the interfaces corresponding to the first wired interface module and the second wired interface module are usually provided with pins or contacts. If the two interface modules match each other, the two wired interface modules are in contact with each other to form an electrical path, thereby realizing the electrical connection and can be used for transmitting the electrical signal.

If the first wired interface module is in contact with the second wired interface module, it indicates the connection between the slave device 120 and the master device 110 is established. If the master device 110 and the slave device 120 detect the electrical signal of the corresponding pins and find that the slave device 120 is currently connected to the master device 110, the master device 110 can send a switching command to the slave device 120 to indicate that the slave device 120 can perform the function switch. Then the slave device 120 switches from performing the first function to performing the second function, or the slave device 120 switches from performing the second function to performing the first function. In one embodiment, the control command is generated by the master device 110, and the master device 110 controls the operating state of the slave device 120. For example, the master device 110 controls at least the operating state of the first processing module 122. In other embodiments, the slave device 120 itself, according to the connection state between the first wired interface module and the second wired interface module, can also switch its operational state and/or currently performed functions of the first processing module 122.

In other embodiments, if the slave device 120 is currently separated from the master device 110, the slave device 120 performs information interactions with the second antenna module of the master device 110 through its own first antenna module 121. In order to facilitate the control of the operating parameters of the slave device 120 by the master device 110, a dedicated channel may be disposed between the slave device 120 and the master device 110. The dedicated channel may be used by the master device 110 to send control commands to the slave device 120. The dedicated channel may be used by the slave device 120 to report its own state to the master device 110. Accordingly, the dedicated channel at least can be used for various information interactions when the master device 110 and the slave device 120 are separated. The dedicated channel may be a channel corresponding to a predetermined carrier wave, or a channel corresponding to a predetermined time slot of all carrier waves. The channel between the master device 110 and the slave device 120 can be divided into: the dedicated channel and other channels than the dedicated channel. If some data comes from the dedicated channel, it indicates that the data belongs to the information transmitted between the slave device 120 and the master device 110 instead of the information transferred from the first electronic device.

For example, the dedicated channel corresponds to a predetermined time slot of all carrier waves between the slave device 120 and the master device 110. But in order to achieve better resource utilization, the predetermined time slot may be a predetermined time domain location for each transmission cycle, while one or more indication bits may also be disposed in each transmission cycle. The indication bit indicates, by its own bits, the usage states of predetermined time domain resources for the current transmission cycle or a specific transmission cycle. If the usage state is the first usage state, the predetermined time domain resource is indicated as the dedicated channel between the master device 110 and the slave device 120. If the usage state is the second usage state other than the first usage state, the predetermined time is indicated as a channel other than the dedicated channel. The channel carries the data transferred by the first electronic device. In this way, on the one hand, the waste of radio resources generated by the fixed setting of the dedicated channel between the master device 110 and the slave device 120 can be avoided. On the other hand, if there are transmissions of information such as the control command or state information and the like between the master device 110 and the slave device 120, the information interaction between the master device 110 and the slave device 120 is also facilitated. After the master device 110 receives the information forwarded by the slave device 120, only the indicator bit needs to be decoded to know whether the current transmission cycle data can be directly transmitted or needs to be extracted by the dedicated channel for local decoding and other processing.

In one embodiment, the first wired interface module and the second wired interface module are a first type interface module. The first type interface module is a composite interface module for power supply and signal transmission.

In one embodiment, the first wired interface module and the second wired interface module are composite interface modules. The composite interface module can simultaneously implement power supply and signal transmission. For example, the composite interface module can be a USB. When the slave device 120 is installed on the master device 110, the slave device 120 and the master device 110 are connected through a USB interface. At this time, the slave device 120 does not need to perform signal amplification or the like. As a passive device, the first antenna module 121 can transmit the first wireless signal according to the first internal signal. At this time, the USB interface serves only as an interface for signal transmission, and is only provided for signal interaction between the master device 110 and the slave device 120.

If the slave device 120 is separated from the master device 110, when the slave device 120 needs to perform functions such as amplifying the first wireless signal, power consumption may occur. At this time, the USB interface is inserted into various power supply devices such as a power socket with a USB socket, a personal computer and the like. The USB interface functions as a power supply interface, and the power supply device supplies power to the slave device 120, thereby providing the power consumption required for the slave device 120 to perform the second function.

In some cases, the USB interface can also serve as an interface for power supply and signal transmission. For example, the slave device 120 is connected to the master device 110. The USB interface can be used for information interaction between the master device 110 and the slave device 120. If the master device 110 currently writes configuration information to the slave device 120, the configuration information may include operating parameters for controlling the slave device 120 to perform the first function and the second function. The slave device 120 may generate power consumption. For example, after the slave device 120 receives the data transmitted by the USB interface, the original record of the memory in the slave device 120 needs to be erased and new configuration information needs to be written. If the slave device 120 has no other functional components, the USB interface also acts as the data interface module and the power supply interface module simultaneously.

Accordingly, the first type interface module in one embodiment can serve as both a power supply interface module and a data interface module. The charging function and data transmission function of the first type interface module can be performed separately or simultaneously.

In one embodiment, the first wired interface module and the second wired interface module are second type interface modules. The second type interface module is a dedicated interface module for signal transmission. The device 120 further includes a power supply module for supplying power to the slave device 120 by the power supply device.

In some embodiments, the first wired interface module and the second wired interface module may be second type interface modules. The second type interface module may be a dedicated interface module for data transmission, e.g., the interface module with the PCI interface or COM interface. If the first wired interface module is a second type interface module, the slave device 120 is further provided with a power supply module. The power supply module is the module for supplying power to the slave device 120 by various power supply devices, e.g., a module that supplies power to the slave device 120 by various electronic devices such as the master device 110, a power outlet, and a personal computer. In some embodiments, the power supply module can charge batteries.

In one embodiment, the power supply module may include a power supply interface component. The posture of the power supply interface component includes a first posture and a second posture. For example, the power interface component can include a foldable or retractable interface. The posture of the power interface component determines whether the power interface component protrudes from the outer surface of the slave device 120. If the master device 110 is connected to the slave device 120, the power supply interface component may not need to be used. In this case, the first posture may be such that the power supply interface component does not protrude from the outer surface of the slave device 120, thereby avoiding disturbing the data connection between the slave device 120 and the master device 110. If the power supply interface component is a foldable interface, the power interface component is in the folded state. If the power supply interface component is a scalable interface, the power interface component is in the contracted state.

The second posture may be such that the power supply interface component protrudes from the outer surface of the slave device 120 so that the slave device 120 can be conveniently inserted into a power supply device such as a power outlet and the like to cause the slave device 120 to receive power. At this time, if the power supply interface component is a foldable interface, the power interface component is in the unfolded state. If the power supply interface component is a scalable interface, the power interface component is in the extended state.

In one embodiment, if the slave device 120 is in contact with the master device 110, the power interface is in the first state to avoid interference with the connection between the signal transmission interface of the slave device 120 and the signal transmission interface of the master device 110. If the slave device 120 is separated from the master device 110, the power supply interface component is in the second state to facilitate establishing a power connection with the third electronic device.

In one embodiment, the conversion module is connected to the power supply interface component of the slave device 120. The conversion module converts a first power supply signal provided by the power supply device into a second power supply signal required by the slave device 120.

In some embodiments, the slave device 120 further includes a conversion module, which may be a transformer. The conversion module can convert a first power supply signal provided by the power supply device such as the power socket into a second power supply signal required by the slave device 120. For example, the conversion module converts the high voltage provided by the power supply device such as the power socket into the low voltage required by the slave device 120. For another example, the conversion module converts the AC signal provided by the power supply device such as the power socket into the DC signal required by the slave device 120. Accordingly, the conversion module in one embodiment can be a converter of various electrical signals such as a transformer. The conversion module can convert the first power supply signal into the second power supply signal required by the slave device 120 by performing operations such as AC/DC conversion and voltage transformation.

In one embodiment, if the slave device 120 is connected to the master device 110, the slave device 120 operates in a first operational mode. If the slave device 120 is separated from the master device 110, the slave device 120 works in a second operational mode. The first processing module 122 is further provided for, if the slave device 120 is connected to the master device 110, generating a first control signal that controls the slave device 120 to be in the first operational mode; or if the slave device 120 is separated from the master device 110, generating a second control signal that controls the slave device 120 to be in the second mode of operation, the second operational mode.

In one embodiment, the first processing module 122 of the slave device 120 itself can generate a first control signal and a second control signal corresponding to the connection state between the master device 110 and the slave device 120, thereby controlling the slave device 120 to be in the first operational mode or the second operational mode.

In some embodiments, the first processing module 122 can be connected to a memory or have its own memory. The memory stores operating parameters of the first operational mode and the second operational mode. When the slave device 120 performs the switching from the first operational mode to the second operational mode, the corresponding operating parameter may be queried according to the first control command and the second control command, thereby enabling the first function to enable the second function, or enabling the second function to enable the first function. In some other embodiments, the slave device 120 can also perform the first function and the second function simultaneously.

In one embodiment, if the slave device 120 is connected to the master device 110, the slave device 120 must perform the first function. The second function may be an option for the slave device 120 function. If the slave device 120 is separated from the master device 110, the slave device 120 must perform the second function. The first function may be an option for the slave device 120 function. In some specific scenarios, the first function may be a sub-function of the second function. In such case, if the slave device 120 performs the second function, the first function must be performed.

In one embodiment, the slave device 120 further includes: a detection module connected to the first processing module 122 for detecting the communication state information of the first communication module 123 and the second communication module, or detecting the connection state information of the first communication module 123 and the second communication module. The communication state information or the connection state information can indicate if the slave device 120 is connected to the master device 110; and the first processing module 122 specifically for, according to the communication state information or the connection state information, generating the first control signal or the second control signal.

In one embodiment, the slave device 120 further includes a detection module. The detection module can be a detection device to detect if the first communication module 123 of various slave devices 120 is connected to or communicates with the second communication module of the master device 110.

For example, if the first communication module 123 and the second communication module include a wired interface module, the detection module may be a detection module for detecting if the first communication module 123 and the second communication module are connected. For example, a detection component such as an ammeter or a resistor is disposed on one pin of the first communication module 123. If the first communication module 123 and the second communication module are connected, the detection component can detect the current signal and/or voltage signal representing the path, otherwise, the detection component can only detect the open electrical signal.

For example, if the first communication module 123 communicates with the second communication module by electromagnetic coupling at a short distance, the detection module is a detection module for detecting if there is a communication between the first communication module 123 and the second communication module. If the first communication module 123 sends data to or receives data from the second communication module, a corresponding electrical signal is generated. The detection module can also detect the corresponding electrical signal for the detection component such as the galvanometer or the resistor detects. The first communication module 123 and the second communication module can be considered to be in a communication state, indicating that the distance between two communication modules of the slave device 120 and the master device 110 are in the effective communication range. That is, the slave device 120 is mounted on the master device 110.

In one embodiment, the slave device 120 includes a first connection module that is adapted to the second connection module of the master device 110. If the slave device 120 is connected to the master device 110, the first connection module physically contacts the second connection module. If the slave device 120 is connected to the master device 110, the contact between the first connection module and the second connection module is removed.

In one embodiment, if the first communication module 123 and the second communication module transmit data through electromagnetic coupling within the effective communication range, in order to ensure stable connection between the master device 110 and the slave device 120, and ensure that the two communication modules are stably in the effective communication range, a first connection module is disposed on the slave device 120, and a second connection module is disposed on the master device 110. The first connection module and the second connection module are provided for connecting the slave device 120 to the master device 110. For example, an accommodating space is disposed on the master device 110. The accommodating space is integrally inserted into the slave device 120. In this case, the enclosure of the slave device 120 is reused as the first connection component to connect the slave device 120 to the master device 110. In other embodiments, in order to ensure that the slave device 120 inserted into the accommodating space maintains a stable posture, the surface of the slave device 120 may be provided with a connection plate, a card slot or the like, which is adapted to the shape and size of the accommodating space. The connection plate and/or the card slot can be used as the first connection module.

In one embodiment, the slave device 120 includes: a first antenna module 121 for, if the slave device 120 performs the first function, transmitting the first wireless signal and receiving the second wireless signal; if the slave device 120 performs the second function, amplifying the first wireless signal to transmit a third wireless signal, receiving the second wireless signal, and transmitting the received second wireless signal to the master device 110; and the first functional component comprising a second antenna module for transmitting a first wireless signal or receiving a second wireless signal transmitted by the second electronic device.

The first antenna module 121 and the second antenna module have different appearances. Or at least one of the first antenna module 121 and the second antenna module is provided with a distinguishing module. In one embodiment, the slave device 120 includes a first antenna module 121, which can transmit and receive the wireless signal.

The first functional component of the master device 110 may include a second antenna module, and may also transmit and receive the wireless signal.

In practical applications, the shape of the slave device 120 may be similar to that of the second antenna module of the master device 110. But in order to facilitate user differentiation, the first antenna module 121 and the second antenna module may be set to different appearances. For example, the enclosure or body of the first antenna module 121 may be square, and the enclosure of the second antenna module may be circular. In some embodiments, a distinguishing module may be disposed in the first antenna module 121 and the second antenna module. The distinguishing module may have various types of distinguishing marks, e.g., distinguishing marks formed by injection molding or pasted marks. By setting the distinguishing module, problems such as damages of the antenna module caused by user's mistakes can be avoided.

Figure 3:
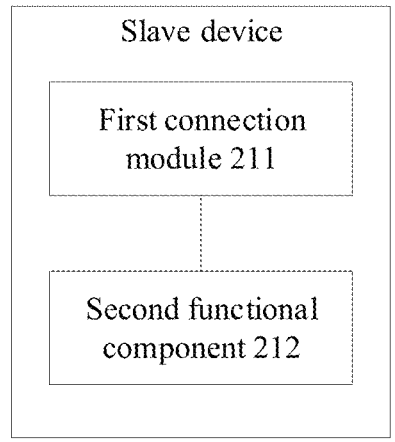
FIG. 3 illustrates a structural diagram of another slave device consistent with the disclosed embodiments.

FIG. 3 illustrates a structural diagram of another slave device consistent with the disclosed embodiments. As shown in FIG. 3, the slave device includes: a first connection module 211 capable of establishing a detachable connection with the master device; and a second functional component 212 for performing the first function of the first functional component of the master device if the slave device is connected to the master device, and performing the second function if the slave device is separated from the master device. The first function comprises: transmitting the first wireless signal and receiving the second wireless signal transmitted by the second electronic device. The second function is different from the first function.

The slave device may be a slave device of the first electronic device described above. The slave device includes a first connection module 211 for establishing a detachable connection with the master device. The detachable connection can be an electrical connection capable of transmitting the data signal or power signal. The detachable connection may also only a physical connection that cannot transmit the electrical signal.

The second functional component 212 performs the second function and the first function. Specifically, the second functional component 212 performs the second function when the slave device is separated from the master device, and performs the first function when the slave device is connected to the master device.

In one embodiment, when the slave device performs the first function, the second functional component 212 transmits the first wireless signal and receive the second wireless signal. When the slave device performs the second function, the second functional component 212 receives and amplifies the first wireless signal, receives the second wireless signal, and transmits the received second wireless signal to the master device.

In one embodiment, the first functional component includes: a first communication module for, when the slave device performs the first function, receiving a first internal signal that generates the first wireless signal from a second communication module of the master device, or transmitting a second internal signal generated according to the second wireless signal to the master device; and a first antenna module connected to the first communication module, for transmitting the first wireless signal and receiving the second wireless signal when the slave device performs the first function.

In one embodiment, the first functional component includes: a first processing module comprising: an amplifying submodule for, when the slave device performs the second function, amplifying a first wireless signal received from the master device and forming a third internal signal; a first antenna module for, when the slave device performs the second function, receiving a first wireless signal transmitted by the master device, transmitting a second wireless signal received by the second electronic device to the master device, and transmitting a third wireless signal corresponding to the first wireless signal according to the third internal signal.

In one embodiment, the first functional component includes: a first communication module for, when the slave device performs the first function, receiving a first internal signal that generates the first wireless signal from a second communication module of the master device, or transmitting a second internal signal generated according to the second wireless signal to the master device; a first antenna module connected to the first communication module, for transmitting the first wireless signal and receiving the second wireless signal when the slave device performs the first function; and a first processing module. The first processing module comprises: an amplification submodule for, when the slave device performs the second function, amplifying the first wireless signal received by the master device and forming the third internal signal; a first antenna module for receiving the first wireless signal transmitted by the master device when the slave device performs the second function, transmitting a second wireless signal received by the second electronic device to the master device, and transmitting a third wireless signal corresponding to the first wireless signal according to the third internal signal.

In one embodiment, if the slave device is connected to the master device, the first processing module is in the first operational state. In the first operational state, at least the amplifying submodule is in the non-operational state. If the slave device is separated from the master device, the first processing module is in the second operational state. In the second operational state, the amplifying submodule is in the operational state.

In one embodiment, the first communications module includes a first wired interface module. The second communication module includes a second wired interface module. If the first wired interface module is in contact with the second wired interface module, the slave device is connected to the master device. If the connection between the first wired interface module and the second wired interface is removed, the slave device is separated from the master device.

In one embodiment, the first wired interface module and the second wired interface module are first type interface modules. The first type interface module is a composite interface for power supply and signal transmission modules. The first wired interface module and the second wired interface module are second type interface modules. The second type interface module is a dedicated interface module for signal transmission. The slave device further comprises a power supply module for supplying power to the slave device by the power supply device.

In one embodiment, if the slave device is connected to the master device, the slave device works in the first operational mode. If the slave device is separated from the master device, the slave device works in the second operational mode. The first processing module is provided for, if the slave device is connected to the master device, generating the first control signal that controls the slave device to be in the first operational mode, or if the slave device is separated from the master device, generating a second control signal that controls the slave device to be in the second operational mode.

In one embodiment, the second functional component 212 further includes a detection module connected to the first processing module. The detection module detects the communication state information of the first communication module and the second communication module, or detects the connection state information of the first communication module and the second communication module. The communication state information or the connection state information can represent if the slave device is connected to the master device. The first processing module generates, according to the communication state information or the connection state information, the first control signal or the second control signal.

In one embodiment, the first communication module and the second communication module perform the signal interaction by electromagnetic coupling. The slave device includes a first connection module 211 that is adapted to the second connection module of the master device. If the slave device is connected to the master device, the first connection module 211 is in physical contact with the second connection module. If the slave device is connected to the master device, the contact between the connection module 211 and the second connection module is removed.

The second functional component 212 includes: a first antenna module for, if the slave device performs the first function, transmitting the first wireless signal and receive the second wireless signal, and if the slave device performs the second function, amplifying the first wireless signal to transmit a third wireless signal, receiving the second wireless signal and transmitting the received second wireless signal to the master device; and a first functional component comprising a second antenna module for transmitting a first wireless signal or receiving a second wireless signal transmitted by the second electronic device.

The first antenna module and the second antenna module have different appearances, or at least one of the first antenna module and the second antenna module is provided with a distinguishing module. The slave device further includes an enclosure on which the second functional component 212 is mounted, e.g., at least a portion of the second functional component 212 is located within the enclosure.

Figure 4:
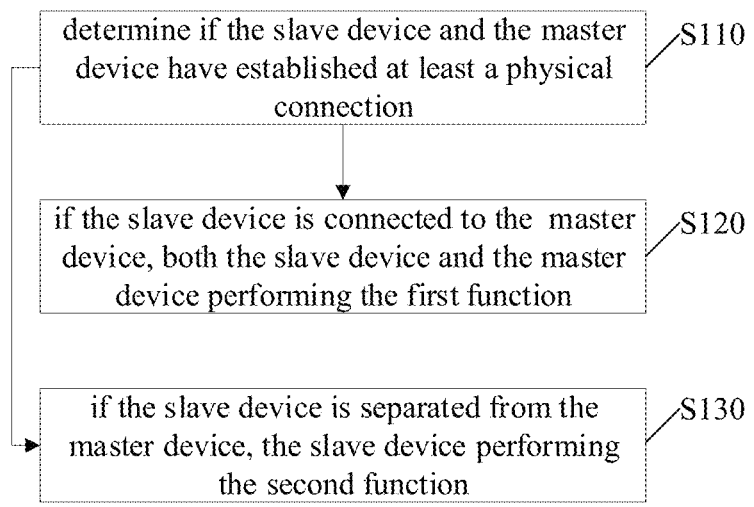
FIG. 4 illustrates a flowchart of an information processing method consistent with the disclosed embodiments.

FIG. 4 illustrates a flowchart of an information processing method consistent with the disclosed embodiments. As shown in FIG. 4, the information processing method includes the followings.

S120: if the slave device is physically connected to the master device, the second functional component of the slave device and the first functional component of the master device performs the first function. The first function includes: transmitting a first wireless signal and receiving a second wireless signal transmitted by the second electronic device.

Step S130: if the slave device is separated from the master device, the slave device performing a second function, wherein the second function is different from the first function.

The information processing method provided in one embodiment can be applied to the first electronic device described above.

First, it is determined if the master device and the slave device of the first electronic device are in contact, and if the electrical connection and/or the physical connection is established. Further, according to whether the slave device is in contact with the master device, the slave device is controlled to perform the corresponding function. For example, the slave device is controlled to perform the second function when it is separated from the master device, and performs the first function when it is in contact with the master device. As shown in FIG. 4, in some embodiments, the method further includes the followings.

S110: determining if the slave device and the master device have at least one established physical connection.

In one embodiment, the information processing method not only enriches the functions of the first electronic device, but also defines the specific execution of the second function of the first electronic device, and has the characteristics of control and simple implementation.

In one embodiment, if the slave device is separated from the master device, the slave device performs the second function. The second function includes: if the slave device is separated from the master device, the slave device receiving the first internal signal from the master device and transmitting the first signal according to the first internal signal; and the slave device receiving the second wireless signal transmitted by the second electronic device, and transmitting the received second wireless signal to the master device.

The first internal signal may be transmitted according to a wired interface or may be transmitted according to the electromagnetic coupling within an effective communication range.

In one embodiment, the method includes: detecting at least one of connection state information and communication state information of the slave device and the master device; and determining that the slave device is connected to or separated from the master device according to at least one of the connection state information and the communication status information.

In one embodiment, at least one of the connection state and the communication state between the slave device and the master device may be detected by the detection module located in the slave device and/or the master device. If the slave device has the connection with the master device or has the communication with the first internal signal, the slave device may be considered to be connected to the master device, otherwise the slave device may be considered to be separated from the master device.

In some embodiments, the operational modes of the slave device include the foregoing first operational mode and the second operational mode. The first processing module of the slave device, according to the connection state between the current slave device and the master device and/or the communication state of the first internal signal, controls the slave device to switch between the first operational mode and the second operational mode. If the slave device works in the first operational mode, the second functional component of the slave device must perform the first function, and may perform the second function. If the slave device works in the second operational mode, the second functional component of the slave device must perform the second function and may perform the first function.

A specific example is provided below in combination with any of the above embodiments. For example, if the area such as a large office, home or entertainment place and the like covered by the wireless signal needs to be relatively large, in far distance from the wireless router, the strength and quality of the wireless signal is poor. It is generally necessary to purchase an additional repeater, and put the repeat in a place where the wireless signal is strong enough, to enhance the effective coverage area of the wireless signal through the amplification function of the repeater. The wireless router provided in one embodiment includes a plurality of antennas. The antennas are classified into two types. The first type is the pluggable antenna, and the other type is the fixed antenna. The number of pluggable antennas may be one or more. The fixed antennas and the enclosure of the wireless router constitute the master device described above. The pluggable antenna may be regarded as the slave device described above. An amplifier or an amplifying circuit is disposed inside the pluggable antenna. After the pluggable antenna is unplugged from the enclosure, the antenna can be used as a repeater. If the pluggable antenna is mounted on the enclosure, the pluggable antenna is used along with fixed antennas as a general antenna for a wireless router. After a user purchases the wireless router, the pluggable antenna can be plugged and unplugged according to his own needs. The user does not need to purchase additional repeaters, which reduces the user's purchase cost and improves the effective use of the wireless router's antennas.

Figure 5:
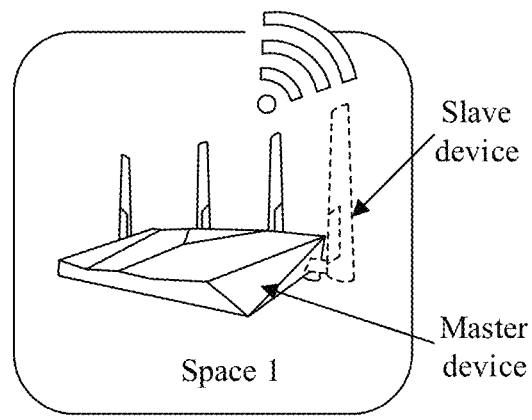
FIG. 5 illustrates a structural diagram of a wireless router consistent with the disclosed embodiments.

FIG. 5 illustrates a structural diagram of a wireless router consistent with the disclosed embodiments. As shown in FIG. 5, the wireless router includes a master device and a slave device. The slave device can be detached from the master device or can be installed on the master device. The slave device may be a special antenna in the master device, and the antenna may be distinguished from other antennas in appearance. For example, the size of the antenna is different from the size of other antennas, and usually the size of the special antenna is larger than the size of other antennas, or the shape of the special antenna is different from the shape of other antennas.

FIG. 5 shows that the wireless router is located in Space 1. If the user's mobile phone, tablet computer, e-book, or laptops are located in a different space (e.g., Space 2 in FIG. 6), there may be a wall or the like between Space 1 and Space 2, or the distance between Space 1 and Space 2 is relatively far. If the wireless router is placed entirely in Space 1, the strength of the wireless signal is already weak when the wireless signal reaches Space 2 or no wireless signal reaches Space 2. It is necessary to purchase an additional repeater to be placed in the position adjacent to Space 2, and then use the repeater to relay the wireless signal to Space 2

Figure 6:
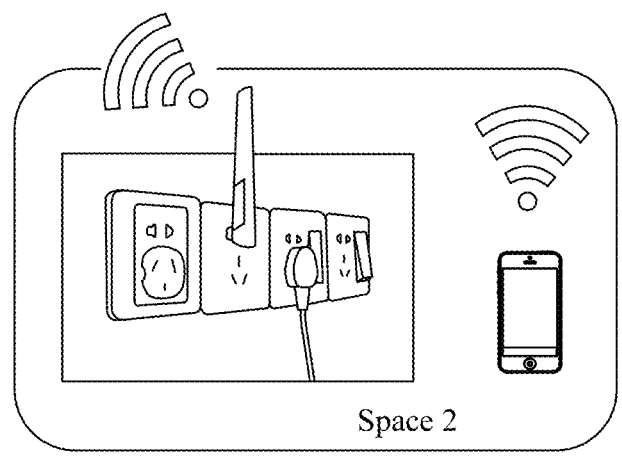
FIG. 6 illustrates an installation diagram of a slave device consistent with the disclosed embodiments.

However, according to the present disclosure, the wireless router in one embodiment is a wireless router including a master device and a slave device. The slave device on the wireless router can be detached from the master device. For example, as shown in FIG. 6, the special antenna in the wireless router can be detached from the master device and inserted into a power supply device such as a power socket located in Space 2. If the slave device can receive the wireless signal of the master device, after the wireless signal is amplified by the slave device, the signal strength in Space 2 is greatly enhanced.

It should be understood that the disclosed devices and method provided in the disclosure may be implemented in other ways. The embodiments described above are merely illustrative. For example, the division of the unit is only a logical function division. In actual implementation, there may be other division ways such as: a plurality of units or components may be combined, or can be integrated into another system, or some features can be ignored or not executed. In addition, the coupling or communication connection of the components shown or discussed above may be indirect coupling or communication connection through some interfaces, devices or units, and may be electrical, mechanical or other forms.

The units described above as separate components may or may not be physically separated. The components displayed as the unit may or may not be physical units. That is, the units may be located in one place or distributed to a plurality of network units. Some or all of the units may be selected according to actual needs to achieve the purpose of the solution of the embodiments.

In addition, each functional unit in each embodiment may be integrated into one processing module. Each unit may also be separately used as one unit. Two or more units may also be integrated into one unit. The above integrated units can be implemented in the form of hardware or in the form of hardware plus software functional units.

Those skilled in the art can understand that all or part of the above steps in the embodiments may be implemented by hardware related to program commands. The program described above may be stored in a computer readable storage medium. The program performs the steps in the methods described in the above embodiments. The storage medium described above includes a mobile storage device, a read-only memory (ROM), a random access memory (RAM), a magnetic disk, or an optical disk and various other medium that can store program codes.

The above descriptions are only the specific embodiments of the present disclosure. The scope of the present disclosure is not limited thereto. Those skilled in the art can easily think of changes or substitutions within the technical scope of the disclosure. It should be covered within the protection scope of the present disclosure. The protection scope of the present disclosure should be subject to the protection scope of the claims.

What is claimed is:

1. An electronic device, comprising:
a master device, connected to a wired network and being a wireless router, the master device comprising a plurality of routing antennas and a master processor configured to conduct a first function via the plurality of routing antennas, the first function including transmitting a first wireless signal and receiving a second wireless signal transmitted by an external electronic device;
a slave device comprising,
at least one routing-amplifying antenna;
a slave processor configured to conduct the first function in response to that the slave device is physically connected to the master device, and to conduct a second function in response to that the slave device is detached from the master device, the second function, being different from the first function, including receiving and amplifying the first wireless signal, receiving the second wireless signal, and transmit the received second wireless signal to the master device via the at least one routing-amplifying antenna;
wherein the slave device is detachably attachable to the master device.

2. The electronic device according to claim 1, wherein the slave device further comprises:
a slave local connector configured to, in response to that the slave device performs the first function, receive a first internal signal that generates the first wireless signal from a second communication module of the master device; or transmit a second internal signal generated according to the second wireless signal to the master device wherein the at least one routing-amplifying antenna is connected to the slave local connector, for transmitting the first wireless signal and receiving the second wireless signal when the slave device performs the first function.

3. The electronic device according to claim 2, wherein:
in response to that the slave device is connected to the master device, the slave processor is in a first operational state for which the amplifying circuit is in a non-operational state;
in response to that the slave device is separated from the master device, the slave processor is in a second operational state for which the amplifying circuit is in an operational state.

4. The electronic device according to claim 2, wherein:
after the slave device is connected to the master device, the slave device operates in a first operational mode;

after the slave device is separated from the master device, the slave device operates in a second operational mode;

the slave processor is provided for, in response to that the slave device is connected to the master device, generating a first control signal that controls the slave device to be in the first operational mode and, in response to that the slave device is separated from the master device, generating a second control signal that controls the slave device to be in the second operational mode.

5. The electronic device according to claim 4, wherein the slave device further includes:

a detection circuit for detecting the communication state information of the slave local connector and the master local connector; or for detecting the slave local connector and the connection state information of the master local connector wherein the slave processor is specifically for, according to the communication state information or the connection state information, generating the first control signal or the second control signal.

6. The electronic device according to claim 2, wherein:

the slave local connector and a master local connector perform signal interaction through electromagnetic coupling;

the slave local connector is adapted to the master local connector of the master device;

after the slave device is connected to the master device, it is determined that the slave local connector is in physical contact with the second connection module; and after the slave device is separated from the master device, it is determined that the contact between the slave local connector and the master local connector is disconnected.

7. The electronic device according to claim 1, wherein the slave device further comprises an amplifying circuit for amplifying the first wireless signal received from the master device and forming a third internal signal when the slave device performs the second function wherein the second function further includes transmitting a third wireless signal corresponding to the first wireless signal according to the third internal signal.

8. The electronic device according to claim 7 further comprises a master local connector, wherein:

the slave local connector comprises a first wired interface;

the master local connector comprises a second wired interface and after a first wired interface is in contact with a second wired interface, it is determined that the slave device is connected to the master device, and after the connection between the first wired interface and the second wired interface is disconnected, it is determined that the slave device is separated from the master device.

9. The electronic device according to claim 8, wherein:

both the first wired interface and the second wired interface are a first type interface, wherein the first type interface is a composite interface for power supply and signal transmission.

10. The electronic device according to claim 7, wherein:

the first wired interface and the second wired interface are a second type interface, wherein the second type interface module is a dedicated interface for signal transmission; and the slave device further includes a power supply for supplying power to the slave device by a power supply device.

11. The electronic device according to claim 1, wherein:

the at least one routing-amplifying antenna and plurality of routing antennas have different appearances.

12. An electronic device as a slave device, comprising:

a slave local connector capable of establishing a detachable connection with a wireless router connected with a network via a wired connection, the wireless router includes a plurality of routing antennas;

a slave processor, in response to that the slave device is connected to the wireless router, performing a first function including transmitting a first wireless signal and receiving a second wireless signal transmitted by an external electronic device;

at least one routing-amplifying antenna; and wherein in response to that the slave device is separate from the wireless router, the slave device performing a second function, which is different from the first function, the second function including receiving and amplifying the first wireless signal, receiving the second wireless signal, and transmit the received second wireless signal to the wireless router via the at least one routing-amplifying antenna, and wherein the slave device is configured to be detachably attachable to the wireless router.

13. An information processing method, comprising:

in response to a slave device being physically connected to a wireless router, the router being connected to an external network via a wired connection, performing a first function of transmitting a first wireless signal and receiving a second wireless signal transmitted by an external electronic device, by using at least one routing-amplifying antenna of the slave device and one of a plurality of routing antennas of the wireless router;

in response to that the slave device is separate from the wireless router, performing a second function of receiving and amplifying the first wireless signal, receiving the second wireless signal, and transmitting the received second wireless signal to the wireless router, and establishing a detachable connection between the wireless router and the slave device by a slave local connector.

* * * * *